Dec. 6, 1949     F. W. ROBERTS ET AL     2,490,093
SPEED CONTROL OF PHONOGRAPH MOTORS
Filed Feb. 8, 1944     2 Sheets-Sheet 1
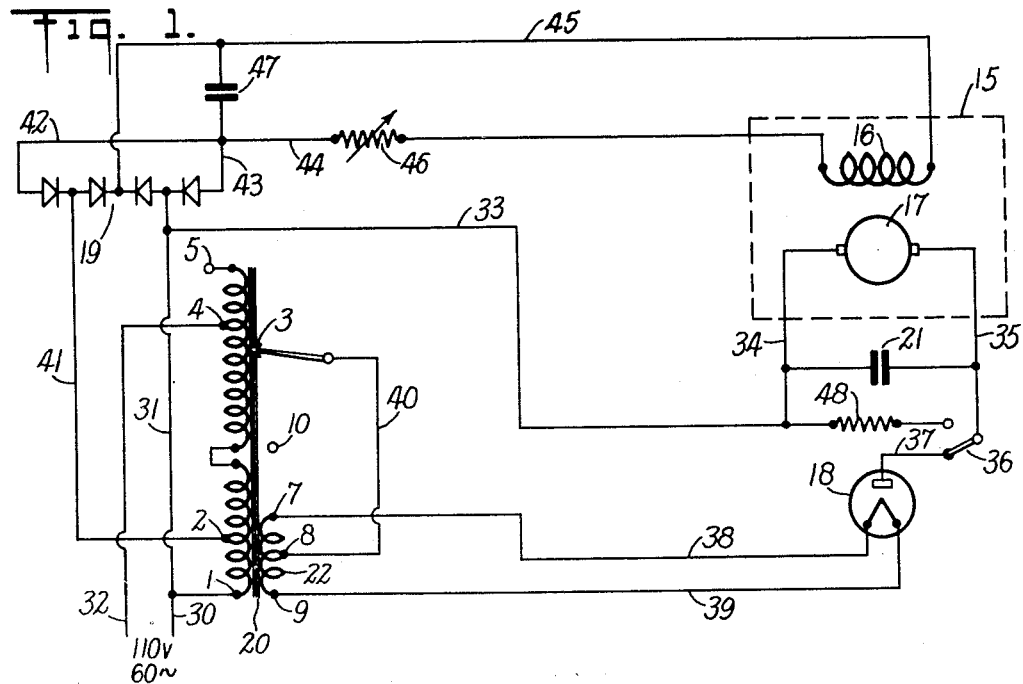
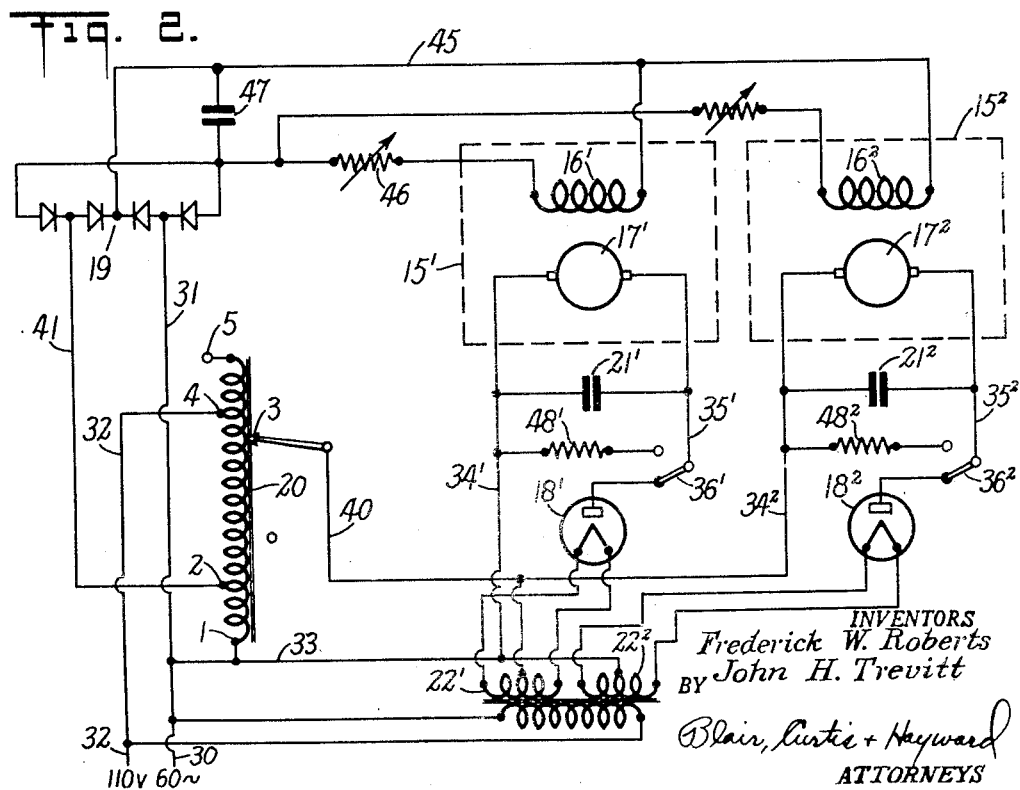
INVENTORS
Frederick W. Roberts
BY John H. Trevitt
Blair, Curtis + Hayward
ATTORNEYS Patented Dec. 6, 1949

2,490,093

UNITED STATES PATENT OFFICE 2,490,093

SPEED CONTROL OF PHONOGRAPH MOTORS

Frederick W. Roberts, Fairfield, and John H. Trevitt, Bridgeport, Conn., assignors to Dictaphone Corporation, New York, N. Y., a corporation of New York Application February 8, 1944, Serial No. 521,528

4 Claims. (Cl. 318—405)

This invention relates to systems for controlling the operation of electric motors; more particularly for controlling the speed of electric motors of commercial recording and/or transcribing machines for use in code intercept work, as when recording high speed radio telegraph messages where a speed range of as much as 15 to 1, and sometimes even higher, may be necessary.

An object of the invention is to provide a simple, reliable and efficient system for the operation of commercial phonograph motors over wide ranges of speed values.

Other objects will be in part obvious and in part pointed out hereinafter.

The invention accordingly consists in the features of construction, combinations of elements, and arrangement of parts as will be exemplified in the structure to be hereinafter described, and the scope of the application of which will be indicated in the following claims.

In the accompanying drawings in which is shown one of the various possible embodiments of this invention—

Fig. 1 is a wiring diagram showing the invention applied to the control of a direct current commercial phonograph motor which is energized from a 110 volt A. C. 50–60 cycle source;

Fig. 2 is a wiring diagram illustrating the invention applied to control the motors of twin phonograph machines;

Similar reference characters refer to similar parts throughout the various views of the drawings.

Figure 3:
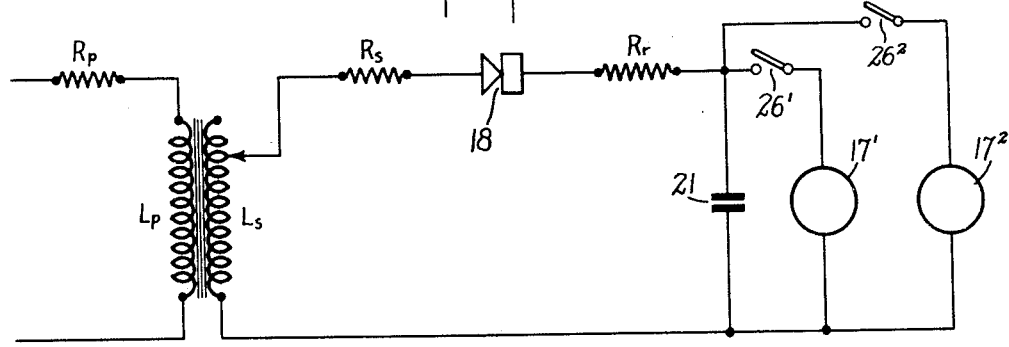
Fig. 3 is a wiring diagram showing the two motor armatures of Fig. 2 connected in parallel with each other and both receiving power from the transformer secondary through a single rectifier.

In carrying out the objects set forth above it was necessary to devise a phonograph drive that could be varied in speed over a range of 15 to 1 or more. The application of such motor control to phonographic equipment required a very wide, smooth change in mandrel speed, and the maintenance of the speed after it was once set. Attempts at loading the usually used variable speed series motor with a centrifugal governor, or a magnetic brake, did not give the proper speed range or the proper speed regulation after it was set. As it was desired to operate the speed control system from an alternating current supply only, it seemed likely that satisfactory results could be attained through the employment of some adaptation of the well known Ward Leonard system which uses a D. C. shunt motor drive. Constant D. C. voltage is supplied to the shunt field of the motor while variable D. C. voltage is fed to the armature thereof from a motor generator set, the output voltage of which is varied. With a shunt D. C. motor the speed is proportional to the armature voltage if the field current is held constant. The speed regulation is good if the regulation of the source of variable armature voltage is good. In the Ward Leonard system the armature current remains relatively constant as the voltage, and hence speed, are changed, and the torque, of course, is constant because in a shunt motor the torque is proportional to the armature current. However, this system did not prove practical for use with commercial phonographic apparatus because of disadvantages connected with supplying D. C. voltage by means of motor generator apparatus.

It was then decided to adapt the Ward Leonard system to A. C. through the medium of electronic valves or tubes. As described above, the system requires a D. C. shunt motor, a source of D. C. for the field and a source of variable D. C. armature voltage with good regulation. This has been accomplished in the past by using mercury vapor rectifier tubes or plate type rectifiers to supply D. C. field voltage. The variable armature voltage has been supplied by controllable discharge tubes such as those known under the trade name of "Thyratrons" or "Grid Glow" tubes. In discussing such systems the name "Thyratron" will be used for convenience. The "Thyratron" system varies the voltage by changing the length of time per A. C. cycle that the tube is allowed to conduct.

For example, for full motor speed the Thyratron is caused to conduct current throughout each alternate half-cycle; and for lower speeds the Thyratron is caused to conduct current for a proportionately shorter period of time during each alternate half-cycle by varying the magnitude or phase of the voltage applied to its control grid. An obvious objection to the use of such a system in the operation of sound recording equipment is the requirement for relatively complex auxiliary control circuits to regulate the control grid potential. As the grid potential is varied, causing the tube to conduct current for shorter intervals of time during its operating half-cycle, the average current through the armature and thus the speed of the motor is reduced. The current delivered by the Thyratron is a series of increasingly narrow pulses separated by greater and greater time intervals as the speed is reduced. If such pulses were applied directly to the motor armature without adequate filtering, the efficiency of the motor would be decreased and the widely spaced pulses would cause irregularities in the speed of the motor thus causing obvious undesirable effects on sound recording equipment operated by such a system. An adequate filter network must therefore be inserted between the Thyratron and the motor to smooth out these short pulses and provide a substantially even flow of current to the armature. At lower speeds it becomes increasingly difficult to smooth these narrow, widely separated pulses into a relatively smooth uniform current. Suitable filter systems to accomplish this are bulky and expensive as compared to that required when current is permitted to flow throughout the full half-cycle. A further objection to the use of Thyratron tubes in connection with sound recording systems is their generation of electrical noise signals. The generation of noise signals is an inherent characteristic of Thyratron type tubes because of the mode of operation wherein current is permitted to flow during only a portion of the half-cycle thus creating steep wave fronts which produce undesirable high frequencies that must be carefully isolated from other circuits in the equipment to prevent interference with the signals being recorded.

In the present adaptation of the Ward Leonard system a 110-volt A. C. 60-cycle power supply is used. The shunt phonograph motor is supplied with rectified alternating current for both the armature and field windings. The armature current required by these motors is sufficiently small to permit the use of standard thermionic rectifiers, such as are used in radio receiving sets. As the field current is to be kept approximately constant, a separate rectifying system is used for this purpose. A low-voltage tap from the transformer employed permits the use of metallic contact rectifiers, and also permits the use of standard motors with their standard (normally series) field properly connected to receive current from the rectifier.

Briefly, then, the invention, as applied to direct current shunt wound motors, contemplates the use in the armature circuits of thermionic rectifiers for converting the alternating current supply into direct current. Separate rectifying means is provided for the field circuit of the motor in the form of either thermionic rectifiers or, preferably, metallic contact rectifiers. The desired large range speed variation is obtained by regulating the input voltage of the armature circuit rectifiers, this regulation being obtained by the use of an auto-transformer having many taps and a sliding contact for varying the voltage impressed upon the armature current rectifier.

The circuit arrangement employed for control of a single phonograph motor will first be described, reference being had to Fig. 1. In this figure the numeral 15 designates the phonograph motor, which is of the direct current, shunt wound type, having a shunt field 16 and an armature 17. The thermionic rectifier for converting the alternating current to direct current for the armature circuit is indicated by numeral 18. This effects half-wave rectification. The metallic contact rectifier which supplies full wave rectification for the field 16 comprises a group 19 of metallic contact rectifiers.

The variable voltage to be supplied to the armature is obtained by use of a commercial type autotransformer 20 with a large number of taps. Half-wave rectification may be used since the inductance of the motor in connection with a bypass condenser 21 is sufficiently high to help maintain the current through the inactive half cycle. The filament current for this rectifier is supplied by an additional winding 22 on the transformer 20.

The transformer 20 is connected to the alternating current source by a circuit comprising the wire 30, section 1—4 of the transformer coil and return wire 32. Connected thus to a 110–115 volt source the output voltage, in the present instance, of the transformer section 1—5 may be controlled by a slider 3 to apply from 0 to approximately 135 volts to the armature circuit as the slider 3 moves over contacts 1 to 5. The motor armature circuit includes wires 30, 31, 33, 34, 35, switch 36, wire 37 to plate of rectifier tube and filament leads 38, 39 connecting the filament to the ends 7 and 9 of the transformer secondary coil 22. A center tap 8 of this coil is connected by wire 40 to the slider 3, the armature circuit being completed through the transformer section 1—3.

The field current rectifier 19 is connected across section 1—2 of the transformer by wires 30, 31 and return wire 41.

The field 16 is connected to the rectifier 19 by wires 42, 43, 44, and 45. The field current may be varied slightly to adjust the speed range by means of a variable resistor 46 in the field circuit. A condenser 47 shunted across the field circuit has been found advantageous to prevent noise being set up in the high gain amplifying circuit used in connection with the phonograph. A condenser of 1 mf. capacity tends to prevent rapid change in the field current. Steep wave fronts are often cause for amplifier interference.

The above described variable transformer provides smooth voltage regulation and the type of rectifier described gives the same voltage drop irrespective of the current through it. Since the variable voltage is secured by means of a variable transformer, the rectifier tube may be used for 100% of the cycle, so only need be large enough to supply the average current.

As the motor requires a certain minimum voltage to overcome its friction losses and the drop in the rectifier, a stop indicated by the numeral 10 has been placed in such a position that the voltage supplied the motor will never fall below that value. This prevents the dial or slider from being turned far enough to stop the motor entirely. When the motor is to be stopped the switch 36 is used.

The transformer may be designed to permit a non-tapped section of the winding to be placed at its lower voltage end, i. e. that portion corresponding to the section below the stop 10 as shown in Figures 1 and 2 of the drawings, so that the full sweep of the contact arm may be used instead of a portion thereof. A dial may be provided to indicate approximate mandrel speed of the phonograph.

An additional control advantage is gained when the field current is taken off from a low voltage tap of the auto-transformer winding, as the section 1—2 of the drawings. This section 1—2 is common to both the field and the armature circuits, and the regulation by the transormer tends to give a wider possible speed range than were the field energized from a separate transformer winding. The reason for this is that as the armature current increases with increased motor speed regulation, the voltage across the transformer field winding decreases slightly due to the increased voltage drop in that section of the winding. This decreases the field current slightly and tends to increase the motor speed, thus giving a wider speed range for a given voltage change across the armature. This transformer regulation gives the motor a differential compound motor characteristic which tends to maintain any given speed setting constant with varying load.

The switch 36 is a single-pole double-throw switch adapted in one position to close the motor circuit through wires 35 and 37 and in its alternative position to open the motor circuit and short circuit the armature of the motor through a resistor 48. This provides a method for quickly stopping the motor by disconnecting the armature from its source of power and simultaneously closing the circuit between the armature terminals through the resistance 48 while the motor field is still energized. This dynamic braking is performed with great rapidity and gives a much more positive and accurately controllable braking effect than is possible with mechanical brakes.

When it is found necessary to record, continuously, matter of too great length to be included on a single record tablet, as when recording lengthy speeches, telephone conversations and the like, twin phonographs comprising two duplicate phonograph units are employed, each having its own drive motor, a mandrel for a record blank, and each mandrel being associated with a carriage which supports a suitable recording device for making a record upon the record blank. Mechanism is employed for causing the alternate operation of the two units in such manner that when the record tablet on the mandrel of one machine is exhausted, or its limits reached, the other machine or unit will automatically be put into operation. To avoid interruption in the sequence of words or sounds being recorded during the period of change-over from one unit to the other, it is customary to allow a period of overlap during which both machines are in operation and making identical records. Such a twin phonograph is disclosed in U. S. Patent 2,026,398 to which reference may be had for a complete description of the machine and its manner of operation. As said above, recording machines for continuous recording usually are equipped with two motors, one for each mandrel, or other record blank moving means.

The employment of half-wave rectification of the output of a suitable transformer, according to the disclosure of the present invention, may be used to provide armature voltage to the motors of a twin phonograph and is particularly advantageous in cases where sometimes one motor will be idle and the other running, and sometimes both motors will be in operation at the same time.

Referring to Fig. 2, armatures $17^1$ and $17^2$ of twin phonograph motors $15^1$ and $15^2$ are connected to receive variable voltage from the slider controlled section 1—3 of the transformer 20, by means of shunt circuits containing respectively the half-wave rectifiers $18^1$ and $18^2$ having their filaments connected to transformer coils $22^1$ and $22^2$. By reference to Fig. 2 it will be seen that the lead 40 from the slider 3 connects with the center tap of filament coil $22^1$ and also through armature $17^2$ with the plate of rectifier $18^2$; and it will be seen further that lead 33 from tap 1 of the transformer connects through armature $17^1$ with the plate of rectifier $18^1$ and also with the center tap of filament coil $22^2$. Thus it will be seen that the second motor armature $17^2$ is connected across the same transformer in a separate parallel circuit in which the rectifier is reversed with respect to the rectifier in the circuit in armature $17^1$, whereby the respective rectifiers will pass current to their motor armatures only during opposite half-cycles of the alternating current supply.

The field coils $16^1$ and $16^2$ of the two motors receive rectified current from the plate type rectifier 19 whose input is connected to section 1—2 of the transformer in the same manner as was described for the single motor shown in Fig. 1 and the dual motors of Fig. 2 operate the same in every respect as the single motor of Fig. 1 whether they are operating alone or together. This advantage is gained by the employment of two reversely connected halfwave rectifiers in the armature circuits of the two motors.

Fig. 3 shows diagrammatically an arrangement in which the motor armatures $17^1$ and $17^2$ are shunted through individual switches across a condenser 21 in series with a rectifier 18 and a transformer secondary coil having inductance $L_s$. In that portion of the circuits which is common to both motors, the resistance of the transformer coil is represented by $R_s$ and the resistance of the rectifier and remaining elements of said portion of the circuits is represented by $R_r$. The inductance of the transformer primary is represented by $L_p$ and the resistance of the primary circuit by the resistance $R_p$. Additionally there will be the mutual inductance of the transformer to be considered.

Figure 4:
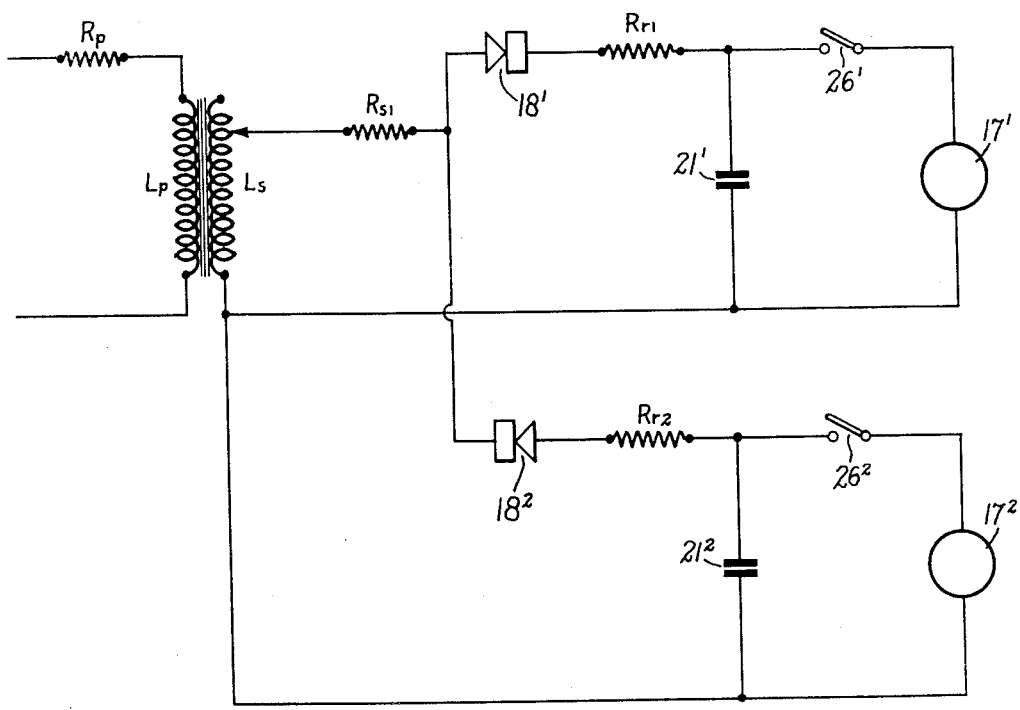
Fig. 4 is a wiring diagram similar to Fig. 3, with the motor armatures connected in parallel with the transformer secondary through separate half-wave rectifiers, the latter being connected respectively in reverse.

Measuring the voltage across the condenser with no motor load in the circuit, we will assume that the voltage is 110. If one motor is connected to the circuit the combined voltage drop of all resistances and inductances may bring the effective voltage down to 105 volts with an assumed motor speed of 800 R. P. M. Now if the second motor is also cut into the circuit, the current would be doubled and, consequently, the voltage drop in all the common resistances and inductances would also be doubled, so we will now have 100 volts across the terminals of the two motors and a speed for both motors of approximately 720 R. P. M. This change in speed would consequently cause slower mandrel rotation and effect a change in tone if these motors were used to drive the records of a recording or reproducing phonograph. Obviously, such change of tone would be annoying, to say the least, and might even affect intelligibility. If, however, we consider Fig. 4, which shows motor armatures $17^1$ and $17^2$ respectively connected in series with the transformer secondary and a half-wave rectifier in shunt circuits, which have inductance $L_s$ and resistance $R_s$ common to both, the rectifiers reversely connected in the two circuits, and the values of the capacities $21^1$ and $21^2$ and the resistances $R_{r1}$ and $R_{r2}$ the same in both circuits, we may again assume a voltage across the terminals of armature $17^1$ of 105 volts and a speed of 800 R. P. M. With the second motor armature $17^2$ switched into operation, the second motor will also have a voltage of 105 volts across its terminals. Since, during the half-cycle that the first rectifier is passing current, the second rectifier is inactive, the only energy which may be supplied to the second motor is what may be stored in the condenser or in the inertia of the moving parts of the motor. By this arrangement the speed of both motors will be the same whether one or both are connected by its switch to the rectifier circuit. It will be appreciated that such an arrangement of the motors of twin phonographs will avoid changes of tone of the recording of reproduction of sound as the operation of the two motors overlap during the making of and/or reproducing continuous records made by the several units of the machine.

It will be seen from the foregoing that the present invention is one well adapted to carry out all of the aims and objects above set forth; that the control system is simple and inexpensive, and offers many advantages in use with motors for phonographs in cases where great speed control is desired and/or where the individual motors of duplicate phonograph units are running successively with a period of overlap.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a circuit for duplicate successively and/or simultaneously operable sound recording machines each being driven by a direct current motor having separate armature and field windings; in combination, an alternating current power supply; a transformer connected to said supply having a winding with both fixed and variable portions adapted to deliver output voltages; a field-energizing circuit including said field windings, a rectifier unit and said fixed portion of said transformer; an armature-energizing circuit comprising parallel armature circuits each including an armature winding and a half-wave rectifier, said variable portion of said transformer being included in each of said circuits, the rectifiers of said respective armature circuits being reversely connected to supply current to their respective armature windings during opposite half cycles of the operating current power supply; and means in said armature-energizing circuit cooperating with said variable portion of said transformer for varying the voltage at which current is supplied to said motor armatures, said fixed portion of said transformer being included in and constituting part of said variable portion, whereby the field energization is modified by the current flowing in said armature-energizing circuit to provide a compounding effect in the regulation of said motors.

2. In a control system for a direct current phonograph motor having separate field and armature windings; an alternating current supply; a transformer connected to said supply and having an output winding including an adjustable portion and a fixed portion, said fixed portion being included in and constituting a part of said adjustable portion; means for adjusting said adjustable portion to produce a variable output voltage to control the speed of said motor; a field circuit including said field winding, a rectifier unit, and said fixed portion of said transformer winding; and an armature circuit including said armature winding, a rectifier unit, and said variable portion of said transformer winding with its included fixed portion, whereby a change in current through said armature circuit affects a change in current through said fixed portion of said transformer winding and thus through said field circuit to produce a compounding effect on said motor.

3. In a control system for a direct current phonograph motor having separate armature and field windings; an alternating current supply; an auto-transformer connected to said supply and having an output winding including an adjustable portion and a fixed portion, said fixed portion being included in and constituting a part of said adjustable portion; means for adjusting said adjustable portion to produce a variable output voltage to control the speed of said motor; a field circuit including said field winding, a rectifier unit, and said fixed portion of said transformer winding; and an armature circuit including said armature winding, a rectifier unit, and said variable voltage portion of said transformer winding with its included fixed portion, whereby a change in current through said armature circuit affects a change in current through said field circuit to produce a compounding effect on said motor.

4. In a circuit for duplicate successively and/or simultaneously operable sound recording machines each being driven by a direct current motor having separate armature and field windings; in combination, a transformer connected to said supply having a ferromagnetic core and a winding with both fixed and variable portions adapted to deliver output voltages; a field-energizing circuit including said field windings, a rectifier unit and said fixed portion of said transformer; an armature-energizing circuit comprising parallel armature circuits each including an armature winding and a half-wave rectifier, said variable portion of said transformer being included in each of said circuits, the rectifiers of said respective armature circuits being reversely connected to supply current to their respective armature windings during opposite half cycles of the operating current power supply; and a movable contact in said armature-energizing circuit cooperating with said variable portion of said transformer for varying the voltage at which current is supplied to said motor armatures, said fixed portion of said transformer being included in and constituting part of said variable portion, whereby the field energization is modified by the current flowing in said armature-energizing circuit to provide a compounding effect in the regulation of said motors.

FREDERICK W. ROBERTS.
JOHN H. TREVITT.

REFERENCES CITED

The following references are of record in the file of this patent:

UNITED STATES PATENTS

| Number | Name | Date |
| --- | --- | --- |
| 1,157,823 | Thomas | Oct. 26, 1915 |
| 1,778,465 | Ozanne | Oct. 14, 1930 |
| 2,100,715 | Jenks | Nov. 30, 1937 |
| 2,192,050 | Norcross | Feb. 27, 1940 |
| 2,303,786 | Bonanno | Dec. 1, 1942 |
| 2,362,650 | Logan | Nov. 14, 1944 |
| 2,375,158 | Wills | May 1, 1945 |